Patented May 10, 1938

2,117,209

UNITED STATES PATENT OFFICE 2,117,209

COMPOSITION AND METHOD FOR JOINING SURFACES

Earle C. Pitman, Lincroft, N. J., assignor to E. I. du Pont de Nemours & Company, Wilmington, Del., a corporation of Delaware No Drawing. Application June 4, 1935, Serial No. 24,896

9 Claims. (Cl. 154—2)

This invention relates to improvements in cementing surfaces and more particularly to a method and composition for use in activating a dried cellulose derivative film on the surfaces to be joined. The invention is particularly adapted to the manufacture of shoes.

In the manufacture of footwear of all kinds, it has been common practice to sew the sole to the upper either directly or through the agency of a welt. In recent years this procedure, particularly in the manufacture of ladies' shoes, has been replaced by a method which consists in cementing the sole to the upper by means of a cellulose derivative cement. Such a method has many valuable advantages, the most prominent of which is the reduction in labor costs. These have been further reduced by a modification of the process which involves applying the cement to either the upper or the sole along the area to be joined and allowing the cement to dry by evaporation of the solvents contained in the composition. The parts are then stored until they are ready to be joined and the cement is activated by applying an active solvent with a brush on the areas to be joined. The parts are then placed in a pressure device until the the film is dry and the parts are securely joined.

The difficulty with this modification resides in the fact that great care must be exercised in selecting the solvent to activate the dried film. The reason for this is that the requirements as to the rate of evaporation of the solvent in the period of time between its application and the contacting of the parts and in the time the joined parts are in the pressure device are diametrically opposite.

The object of this invention is to provide a liquid for activating a dried cellulose derivative film and which will retain the film in this condition for a time sufficiently long to allow considerable latitude in placing the parts in contact with each other and which at the same time will dry rapidly in the pressure device.

A further object is the provision of a method of joining surfaces which affords a more uniform bond between the parts being united.

A still further object is a method of preparing shoes which allows the employment of less skilled workmen for operations which heretofore required the services of very adept and highly trained men. Other objects will appear as the description of the invention proceeds.

These objects are accomplished by the use of a mixture of organic liquids the predominating component of which is a highly active and volatile solvent for the film which is to be activated; and one component of which is a liquid of relatively low volatility and having high solvent power for the cellulose derivative to be activated.

In my copending application S. N. 24,895, now Patent No. 2,092,084 filed on even date herewith, I have disclosed a composition and method for its use in cementing surfaces. The composition therein disclosed comprises a highly volatile solvent and a liquid which is substantially non-volatile, such as dibutyl phthalate. In this application, I employed a highly active solvent of high volatility in conjunction with a solvent of comparatively low volatility, the exact order of which will be described more completely hereinafter.

In order to understand the nature of the ingredients which are suitable in such compositions, the following examples are given by way of illustration:

Example 1

| | Per cent |
|---|---|
| Acetone | 98 |
| Butyl lactate | 2 |
| | 100 |

Example 2

| | Per cent |
|---|---|
| Propylene oxide | 97 |
| Butyl lactate | 3 |
| | 100 |

Example 3

| | Per cent |
|---|---|
| Acetone | 98 |
| Butyl propionate | 2 |
| | 100 |

Example 4

| | Per cent |
|---|---|
| Isopropyl acetone | 98 |
| Ethyl lactate | 2 |
| | 100 |

Example 5

| | Per cent |
|---|---|
| Propylene oxide | 75 |
| Acetone | 23 |
| Butyl cellosolve (ethylene glycol monobutyl-ether) | 2 |
| | 100 |

Example 6

| | Per cent |
|---|---|
| Acetone | 77 |
| Diethyl ether | 20 |
| Butyl lactate | 3 |
| | 100 |

Example 7

| | Per cent |
|---|---|
| Acetone | 98 |
| Methyl cellosolve adipate | 2 |
| | 100 |

Example 8

| | Percent |
|---|---|
| Acetone | 97 |
| Di-n-butyl adipate | 3 |
| | 100 |

Example 9

| | Percent |
|---|---|
| Acetone | 97 |
| Dibutyl phosphate | 3 |
| | 100 |

Example 10

| | Percent |
|---|---|
| Diethyl ether | 20 |
| Ethyl acetate (absolute) | 10 |
| Hexane | 25 |
| Isopropyl acetone | 44 |
| Butyl lactate | 1 |
| | 100 |

In the above examples it will be apparent that in each formula the percentage of highly volatile active solvent or mixture thereof predominates and the remaining percentage is made up by a solvent having a low evaporating rate which I call a modifier. In selecting a generic definition for the modifier considerable difficulty was encountered and it has been necessary to resort to an arbitrary genus in the definition. Briefly stated, it has been found that organic liquids which are good solvents for the cellulose derivative film to be activated, having an evaporation rate at room temperature less than that of amyl acetate under the same conditions are satisfactory.

Example 10 represents a special modification which, in addition to the several specific advantages common to the examples illustrating the invention, is characterized by non-staining properties. Considerable difficulty has been experienced in the past in the manufacture of cemented shoes because of the tendency for the softener or activator utilized in softening the hardened cement to extract tannin and other coloring matter from the leather sole and carry a stain into the upper by a wicking or capillary action. This effect is particularly troublesome where the uppers are of white fabric or light colored suede.

In preparing a cement softener to avoid staining, solvents which contain water are to be avoided. Certain alcohols, for example, methyl and ethyl alcohols, are undesirable in softener compositions where staining must be prevented. Absolute ethyl acetate causes very little staining as compared to the 85% commercial grade. The ether type solvents such as diethyl ether and propylene oxide and the aromatic and aliphatic hydrocarbons generally do not extract coloring matter from vegetable tanned leather and may be used as illustrated in Example 10.

It has been found that the following test serves very well for a qualitative test of the solvent power of the liquid under consideration. A film composed of 10 parts of camphor and 90 parts nitrocellulose, having a viscosity characteristic of 16 seconds and nitrogen content of 12.3% was cast on a glass plate from a solution in volatile solvents to give final dry film thickness of 0.003". This film was subsequently removed and cut into pieces for making the desired tests on the solvent modifiers as identified above. These pieces of dried nitrocellulose film were tested by placing them on the surface of a felt pad saturated with the solvent modifier and by rubbing the finger very lightly but continuously over the film surface. In order to prevent loss of the solvent modifier during the test, the felt pad was placed in a semi-closed container. The time for penetration of the modifier was established by considering as the end point the stage at which the solvent had softened the dry film sufficiently to give it a soft tacky surface easily detected by the moving finger.

The following table gives the results obtained with a number of liquids:

| | Penetration time Seconds |
|---|---|
| Ethylene glycol monomethyl ether | 46 |
| Amyl acetate | 60 |
| Ethylene glycol monoethyl ether | 61 |
| Diacetone alcohol | 70 |
| Butyl propionate | 85 |
| Ethyl lactate | 104 |
| Ethylene glycol monobutyl ether | 112 |
| Butyl lactate | 122 |
| Methyl cyclohexanone | 152 |
| Diethylene glycol monoethyl ether | 235 |
| Diethylene glycol monobutyl ether | 270 |
| Ethylene glycol monomethyl ether adipate | 110 |
| Di-n-butyl adipate | 240 |
| Tributyl phosphate | 260 |
| Diethyl phthalate—no softening of film up to | 900 |
| Dibutyl phthalate—no softening of film up to | 900 |

The last 5 compounds were tested on a nitrocellulose film prepared as described above except it was cast at 0.0015 inch in thickness.

It was also observed that certain softeners and plasticizers such as diethyl phthalate, dibutyl phthalate, castor-oil, etc., have practically no solvent action on the dry nitrocellulose film and consequently materials of this type do not come within the scope of this invention, and where the claims are limited to active solvents such plasticizers and softeners are not included.

It is apparent that if compositions containing other cellulose derivatives are to be activated, the cast film will be prepared from the corresponding cellulose derivative in making the test.

As mentioned above the modifier must not only be a solvent but must evaporate at a rate less than amyl acetate at room temperatures. I have found that the following test may be used in comparing the evaporation rate of any liquid with that of amyl acetate and that consistent results are easily obtained:

2 cc. of the liquid to be tested are placed at room temperature in a tared, open metal cup 2½ inches in diameter and 1 inch deep. These cups are placed on a turntable which revolves at about 1 R. P. M. The apparatus also includes a guard about 3½ inches high around the periphery of the turntable, but not attached to it in order to prevent direct drafts. At regular intervals, weighings are made to determine the loss by evaporation. This loss is calculated on a percentage basis and compared with the loss of amyl acetate. I have found it convenient to assign the arbitrary figure of 100 to amyl acetate. It will be apparent therefore that any liquid having a number on this basis of less than 100 and which is a good solvent for nitrocellulose or other cellulose derivative may be used with a highly active volatile solvent according to my invention.

The following table gives these values for some of the modifiers which may be used:

|  | Time exposed: 4 hrs.—40 mins. | Time exposed: 8 hours |
|---|---|---|
|  | Amyl acetate 60% evaporated | Amyl acetate 97% evaporated |
| Amyl acetate | 100 | 100 |
| Ethyl lactate | 37 | 39 |
| Butyl lactate | 11 | 11 |
| Ethylene glycol monomethyl ether | 85 | 92 |
| Ethylene glycol monoethyl ether | 60 | 66 |
| Ethylene glycol monobutyl ether | 16 | 16 |
| Diacetone alcohol | 37 | 33 |
| Diethylene glycol monomethyl ether | 7 | 5 |
| Butyl propionate | 78 | 77 |
| Methyl cyclohexanone | 21 | 23 |

It has been found that films of dried nitrocellulose, particularly on shoe parts such as the sole and upper, may be activated with a softener of this type and as long as 30 seconds may elapse before the parts are joined and placed in a pressure device and still a very strong bond obtained. If a highly volatile solvent alone is used for activating the nitrocellulose film, the parts must be joined within 10 or 15 seconds, or a weak joint will be formed in which there are spots where the adhesive became dry. On the other hand, when an activator of the type herein disclosed is used, the period between applying the activator and joining the parts may be extended to 30 seconds.

Obviously, of major importance is the joint strength which is secured in utilizing the compositions of the present invention for activating the previously applied and hardened cement film. The following table illustrates the unusually long time period available for assembling the softened cement coated parts, the decreased time required in the pressure device and the actual joint strength developed immediately after removal from the pressure device and after overnight storage. In preparing the samples for test, 6" x 1" strips of roughened outsole leather were coated with two coats of a pyroxylin cement, composition as follows:

| | Per cent |
|---|---|
| Pyroxylin (viscosity 7 sec.) | 20.0 |
| Ethyl alcohol (denatured) | 9.0 |
| Camphor | 3.8 |
| Dibutyl phthalate | 1.2 |
| Methyl acetone | 66.0 |
| | 100.0 |

The viscosity characteristic of the nitrocellulose utilized in this cement was determined in accordance with A. S. T. M. designation D–30–33, formula A.

The following table gives the experimental data upon which these remarks are based:

| Composition | | Time elapsed before pressing | Time in pressure device | Joint strength on removal | Joint strength after overnight "setting" period | Remarks |
|---|---|---|---|---|---|---|
| | | Seconds | Minutes | Pounds | Pounds | |
| Acetone | 99% | 30 | 10 | 0–3 | 8–10 | Skips—too dry. |
| Dibutyl phthalate | 1 | | | | | |
| Acetone | 99% | 15 | 15 | 5 | 20 | Uniform pull. |
| Dibutyl phthalate | 1 | | | | | |
| Acetone | 98% | 30 | 10 | 4 | 22 | Do. |
| Butyl lactate | 2 | | | | | |
| Acetone | 98% | 30 | 10 | 5 | 19 | Do. |
| Diacetone alcohol | 2 | | | | | |
| Acetone | 98% | 30 | 10 | Spotty | | Skips. |
| Butyl acetate | 2 | | | | | |
| Acetone | 98% | 30 | 10 | 5 | 20 | Uniform pull. |
| Butyl cellosolve | 2 | | | | | |
| Acetone | 98% | 30 | 10 | 5 | 18 | Do. |
| Ethyl lactate | 2 | | | | | |
| Acetone | 98% | 30 | 10 | 4 | 17 | Do. |
| Butyl propionate | 2 | | | | | |
| Acetone | 98% | 30 | 10 | 4–5 | 18 | Do. |
| Butyl ether of diethylene glycol | 2 | | | | | |
| Acetone | 97% | 30 | 10 | 5 | 19 | Do. |
| Butyl ether of diethylene glycol | 3 | | | | | |
| Acetone | 97% | 30 | 10 | 4 | 20 | Do. |
| Methyl cellosolve adipate | 3 | | | | | |
| Acetone | 97% | 30 | 10 | 3+ | 19 | Do. |
| Di-n-butyl adipate | 3 | | | | | |
| Acetone | 97% | 30 | 10 | 4 | 22 | Do. |
| Tributyl phosphate | 3 | | | | | |
| Acetone | 98% | 30 | 10 | 4+ | 19 | Do. |
| Methyl cellosolve adipate | 2 | | | | | |
| Acetone | 98% | 30 | 10 | 3 | 17 | Do. |
| Dimethyl phthalate | 2 | | | | | |
| Acetone | 97% | 30 | 10 | 2 | 10 | Weak joint. |
| Dibutyl phthalate | 3 | | | | | |

| Composition | | Time elapsed before pressing | Time in pressure device | Joint strength on removal | Joint strength after overnight "setting" period | Remarks |
|---|---|---|---|---|---|---|
| | | Seconds | Minutes | Pounds | Pounds | |
| Acetone | 77% | 25 | 7 | 6 | 18 | Uniform pull |
| Diethyl ether | 20 | | | | | |
| Butyl lactate | 3 | | | | | |
| Acetone | 67% | 25 | 7 | 6 | 16 | Do. |
| Diethyl ether | 30 | | | | | |
| Butyl lactate | 3 | | | | | |
| Isopropyl acetone | 77% | 25 | 7 | 6 | 15 | Few skips. |
| Hexane | 20 | | | | | |
| Butyl lactate | 3 | | | | | |
| Propylene oxide | 97% | 15 | 5 | 6 | 21 | Uniform pull. |
| Butyl lactate | 3 | | | | | |

The joint strength test results were obtained by inserting the hook of a small spring type tensile tester, previously calibrated against a standard Scott Tensile Tester into the end of one of the joined leather strips and manually pulling the strips apart, observing at the same time the numerical reading in pounds thus recorded on the spring tester. The uniformity of the joint may likewise be observed by noting any fluctuation that may occur on the readings on the tester during the separation of the cemented surfaces.

In referring to the above table, it will be observed that acceptable joint strength is obtained where dibutyl phthalate (composition 2) is used as the modifier and the time cycles set as indicated. However, when the time period for the assembly operation is extended to 30 seconds and the pressing cycle reduced to 10 minutes, the resulting joint is defective both in uniformity and strength. On the other hand these desirable time factors can be readily met in utilizing the modifiers of the present invention, as clearly represented in the results of tests with the improved compositions.

Attention is also invited to the results secured from the last composition in the table where the time cycle for the pressing operation is unusually short although the ultimate joint strength is of the highest order. It is preferred in this case to operate at an assembly time cycle of approximately 15 seconds since because of the extremely high volatility of the propylene oxide there would be a greater tendency to produce "skips" or non-uniform adhesion with a resultant faulty joint. It is particularly noteworthy, however, that with approximately one-third of the time cycle normally required for the pressing operation that a joint of superior strength was secured.

In an actual factory test run on the third composition in the table, the time cycle for assembly was increased to 20 seconds (almost double the time previously permitted) and the time for the unit in the pressure device reduced to 7 minutes (about one-half the time usually allotted). The ultimate joint strength secured was commercially satisfactory.

Another advantage of the present invention resides in the reduction of time required in the pressing device. In the manufacture of shoes, it is customary to place the assembled parts in such a device under a pressure of 45 to 60 lbs. per sq. inch for about 15 minutes, or until substantially complete elimination of the softener has been effected. By using the activator herein described, this time may be reduced from 5 to 10 minutes and joints of acceptable strength may be secured when applying pressures somewhat less than those commonly used at present although this pressure is not critical and may be increased to as high as 80 lbs. per sq. inch or even greater.

In the manufacture of cemented shoes as suggested above it is highly desirable that the time period for assembling the parts be sufficient to allow the slower and less adept operators to join the parts before the activator drys to such an extent that a uniform firm bond is not secured. Diametrically opposite to this requirement is the necessity of using an activator which will evaporate quickly in the pressure device. Either one of these conditions may be easily met. However, considerable difficulty is experienced in finding an activating composition which will satisfy both requirements. If the activator is composed of greater proportions of solvents of intermediate volatility or appreciable amounts of substantially non-volatile modifiers in combination with a highly volatile solvent, the time period for the joining step is satisfactory but the necessity for a longer period in the pressure apparatus prohibits the use of such compositions commercially.

The compositions of the present invention afford the basis for operations under the preferred time limitations, that is, adequate time for proper assembly of the softened cement coated parts even for the less adept operators and an acceptable time cycle for the unit while in the pressure device. The greatest part of the softener is composed of highly volatile materials of good solvent power which obviously function to efficiently soften the cement film. This highly volatile portion is, of course, readily dissipated while the unit remains under pressure. The softener compositions are modified by the inclusion of a small quantity of a material of much lower volatility which is also an active solvent for the hardened cement film. This modifier functions primarily to maintain the softened cement film in a tacky condition as long as possible so as to permit the proper assembly of the parts without the development of dry areas which reduce the strength of the final joint. This desirable property is doubtless partially due at least to the properties inherent to the modifiers as already described (solvent power and low volatility) but they may also hold back to some degree the too rapid complete dissipation of the more volatile portion of the softener composition. Peculiarly the presence of this modifier of low volatility does not necessitate a longer time cycle for the pressure device. It is probable that the greater solvent power of these modifiers as compared to those heretofore proposed may permit penetration of this material through the cement film and into the porous leather and be eliminated in this manner thus avoiding the necessity of unduly long time cycles while the parts are held under pressure.

In the examples, a modifier ingredient content of 1 to 3% is indicated as the preferred range. However, this ratio is not critical and the modifier may conveniently range betwen 0.5 and 5%, depending upon the character of the ingredients which make up the main body of the softener. Quantities less than 0.5% will have only a slight influence on the working properties of the activator. On the other hand, where the modifying ingredient is present in amounts greater than 5%, the time cycle for the pressure application is adversely affected.

The invention is not limited to methods which involve nitrocellulose cements, but is also operative where the cement contains other cellulose derivatives such as cellulose acetate or cellulose ethers such as ethyl or benzyl cellulose. The selection of a proper activator can be readily obtained by reference to the tests indicated above.

While it will appear from the above disclosure that the one object of this invention is to increase the time cycle between the application of the activator and the joining of the parts, it should be understood that the parts may be joined at any time after the activator is applied and it is not necessary to wait 30 seconds before this is done.

The cement softener compositions described herein may be used for activating any cement film of the type disclosed and is particularly adapted to the manufacture of shoes. The invention is also useful in the manufacture of leather belts such as those used for power transmission, joining celluloid objects, motion picture film, lacquered paper or lacquered regenerated cellulose, and sealing cellulose derivative wrapping materials. The composition is also useful in the manufacture of laminated paper containers wherein the paper is first coated with a pyroxylin composition having adhesive properties and when this is dry applying the activator until a suitable degree of tack is obtained and then fabricating the laminated paper structure. Other uses will readily present themselves to those skilled in the art.

The compositions herein disclosed may also be used for joining the abutting edges along a carpet seam by means of a strip of tape. In this instance the fabric tape is coated with any desired thickness of a nitrocellulose adhesive by any of the well known fabric coating processes that will provide a uniform coating. This is dried and then activated with a softener just prior to affixing the fabric tape along and over the adjacent edges of the carpeting. This utility tolerates the addition of proportionately greater quantities of solvents of slightly lower volatility than acetone, such as ethyl acetate, but by the incorporation of an ingredient of relatively low volatility, such as butyl lactate, as indicated in the present invention, the adhesion of the tape and, therefore, the strength of the ultimate carpet seam is greatly enhanced.

It will also be observed in practicing this invention that greater joint strength is secured in using the disclosed compositions. Not only is this true of the ultimate joint, but also of the temporary joint during the period immediately following the treatment in the pressure device. In this connection, some difficulty has been heretofore experienced by the tendency of the sole and upper of a shoe to spring apart after the shoe is removed from the pressure device due to the insertion of a metal reinforcement in many cases. This difficulty has been largely overcome by the herein disclosed method. It will readily be seen from this disclosure that the invention may be readily adopted in the manufacture of cemented material without departing from the present industrial practice.

It is apparent that many widely different embodiments of this invention may be made without departing from the spirit and scope thereof; and, therefore, it is not intended to be limited except as indicated in the appended claims.

I claim:

1. A cellulose derivative cement activator which on evaporation leaves substantially no residue having a solvent action on a dry cellulose derivative film which consists of 95 to 99.5% of a highly volatile organic liquid composed of material selected from the class consisting of acetone, iso-propyl acetone, propylene oxide, diethyl ether, ethyl acetate, hexane, and from 0.5 to 5% of an active solvent which has an evaporation rate at room temperature lower than that of amyl acetate.

2. Product of claim 1 in which the said organic liquid is acetone and the slowly evaporating solvent is butyl lactate.

3. In the process of cementing materials wherein at least one of which is coated with a cellulose derivative cement and allowed to dry before joining the parts, the improvement which comprises activating the said film with a composition which on evaporation leaves substantially no residue and which has an active solvent power on the said dry cellulose derivative film and which consists of 95 to 99.5% of a highly volatile organic liquid and from 0.5 to 5% of an active solvent for the cellulose derivative which has an evaporation rate at room temperature lower than that of amyl acetate.

4. The process of claim 3 in which the highly volatile organic liquid is composed of material selected from the class consisting of acetone, iso-propyl acetone, propylene oxide, diethyl ether, ethyl acetate, and hexane.

5. Process of claim 3 in which the highly volatile liquid is acetone.

6. Process of claim 3 in which the highly volatile liquid is propylene oxide.

7. Process of claim 3 in which the slowly evaporating liquid is butyl lactate.

8. Process of claim 3 in which the solvent mixture contains about 98% acetone and about 2% butyl lactate.

9. Product of claim 1 having approximately the following composition:

| | Percent |
|---|---|
| Diethyl ether | 20 |
| Ethyl acetate | 10 |
| Hexane | 25 |
| Iso-propyl acetone | 44 |
| Butyl lactate | 1 |

EARLE C. PITMAN.